Aug. 29, 1961  R. J. SHERIN  2,998,577
ELECTRICAL INVERTERS
Filed July 27, 1959

INVENTOR.
RICHARD J. SHERIN
BY
K. W. Thomas
ATTORNEY

United States Patent Office 2,998,577
Patented Aug. 29, 1961

2,998,577
ELECTRICAL INVERTERS
Richard J. Sherin, Seattle, Wash., assignor to Boeing Airplane Company, Seattle, Wash., a corporation of Delaware
Filed July 27, 1959, Ser. No. 829,622
5 Claims. (Cl. 331—112)

This invention relates to a regulated flyback inverter and, more particularly, to one that is suitable for use as an electronic photo-flash circuit.

In an electronic photo-flash circuit, a load capacitor is charged up from a low initial voltage to some higher voltage. A photo-flash bulb is connected across the load capacitor and when a flash exposure is desired, the circuit is completed so that the load capacitor is discharged through the photo-flash bulb. Various types of inverter circuits, such as the Royer inverter, have heretofore been utilized as an electronic photo-flash circuit. However, such prior art circuits, such as the Royer inverter, have several limitations when utilized as a photo-flash circuit. For instance, the energy transfer efficiency in charging up the load capacitor from zero initial voltage to some higher voltage has a theoretical fifty percent upper limit. The reason for this is that these prior art inverters such as Royers have an equivalent output circuit comprising a constant voltage in series with a resistor. Thus, the recycle time for the photo-flash circuit is increased due to this inefficient transfer of energy while charging up the load capacitor. In addition, owing to the circuitry of these prior art inverters, a relatively high back voltage appears across the output or power rectifier. Therefore, the power rectifier when so utilized must have a high voltage rating, thus increasing its cost.

In accordance with this invention, a flyback power inverter, having a two step energy transfer process and unique regulating means, is utilized as the electronic photo-flash circuit. Presently used electronic photo-flash circuits do not utilize the flyback principle. Of course, flyback circuits of themselves are well known in the art and means have heretofore been provided for regulating the output voltage of a flyback circuit. However, the prior art regulating means for a flyback inverter when utilized as an electronic photo-flash circuit has several disadvantages. One disadvantage is that the regulation is asymptotic and thus a transient condition exists before a substantially constant regulated value is reached. This would increase the recycle time for an electronic photo-flash circuit if such a prior art regulated flyback inverter were utilized. Further, most known types of regulators for flyback inverters control the current level to the input or power winding of the inverter at the instant the flyback occurs. Thus, the frequency of operation of the associated power transistor is increased when the flyback inverter is regulating at the terminal voltage. This relatively high frequency of operation of the power transistor effects a higher energy loss in the overall system due to the higher number of transistions that the power transistor makes in going from the on to the off condition. Further, the average core losses in these prior art inverters when regulating at the terminal voltage are greater. Therefore, the over-all efficiency of these prior art regulated flyback inverters is relatively low.

An object of this invention is to provide for charging a capacitive load from a low initial voltage to some higher voltage at a higher energy transfer efficiency.

Another object of this invention is to provide for reducing the recycle time in electronic photo-flash circuits by utilizing a flyback power inverter having a high energy transfer efficiency in charging a capacitive load from a low initial voltage to some higher voltage.

A further object of this invention is to provide a new and unique means for regulating the output terminal voltage of a flyback power inverter so that the terminal voltage is substantially independent of the magnitude of the output voltage of the direct-current input source.

Still another object of this invention is to provide voltage regulation for a flyback power inverter which is non-asymptotic so as to further reduce the recycle time when the inverter is utilized for instance as an electronic photo-flash circuit.

A still further object of this invention is to provide for so regulating a flyback power inverter that the power transistor operates at a relatively low frequency when regulating at the terminal voltage, thus minimizing the total energy loss in the system over a period of time by the action of the transistor in going from the on to off condition.

Another object of this invention is to provide an inverter suitable for use as an electronic photo-flash circuit in which the output or power rectifier can have a lower voltage rating.

Other objects of this invention will become apparent from the following description when taken in conjunction with the accompanying drawing in which.

Figure 1:
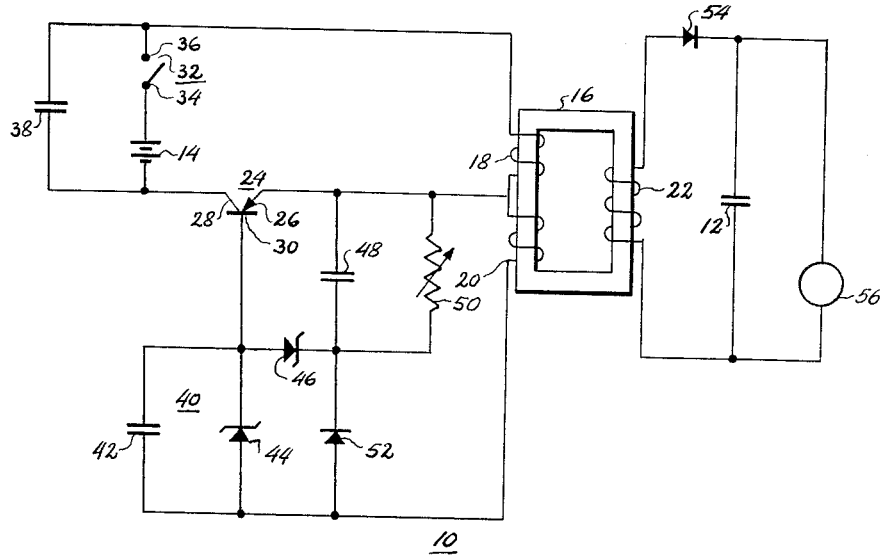
FIG. 1 is a schematic diagram of the apparatus and circuits illustrating one embodiment of this invention.

Referring to FIG. 1 there is illustrated a regulated flyback power inverter 10 illustrating one embodiment of the teachings of this invention. In operation, the regulated flyback power inverter 10 charges a load or output capacitor 12 from a low initial voltage to some higher voltage at a high energy transfer efficiency between an input direct-current source, specifically a battery 14, and the load capacitor 12. A magnetic core member 16, having an input or power winding 18, a hold winding 20, and an output winding 22 disposed in inductive relationship therewith, is utilized to store energy from the input source 14 and effect a transfer of this energy to the load capacitor 12. The hold winding 20 also serves as a voltage sensing winding when energy is being transferred to the load capacitor 12. In practice, the magnetic core member 16 has a hysteresis loop such as to effect a minimum of energy loss during an energy transfer cycle of the inverter 10. A high Q powdered magnetic iron core member is an example of a core member that has such a characteristic.

In order to control the flow of current from the input source 14 through the input winding 18, to thus store energy in the magnetic core member 16, an amplifying device, specifically, a p-n-p junction type transistor 24 having control and load electrode means, specifically, an emitter electrode 26, a collector electrode 28 and a base electrode 30, is interconnected with the input winding 18 and with the input source 14. The latter interconnecting means includes a switch 32, having a movable contact member 34 disposed to be actuated into engagement with a stationary contact member 36, so that the energizing circuit to the input winding can either be manually completed or interrupted. As illustrated, a capacitor 38 may be connected in shunt circuit relationship with the series circuit including the direct-current source 14 and the switch 32 in order to render the current drain from the input source 14 substantially constant, thereby maximizing the efficiency in energy transfer from the direct-current source 14 to the load capacitor 12.

In practice, the amplifying device 24 should have characteristics such that a maximum output current for the device is reached when a given control signal is applied to the device and a decrease in output current from the maximum to substantially zero value is effected when the control signal in the device is decreased sufficiently.

For the purpose of effecting a flow of control current from the hold winding 20 through the transistor 24, during the flyback portion of the operation, a parallel circuit 40, one branch of which includes a capacitor 42 and the other branch of which includes a non-linear device, such as a low voltage Zener diode 44, is interconnected between the lower side of the hold winding 20, as shown, and the base electrode 30, of the transistor 24, the upper side of the hold winding 20 being connected to the emitter electrode 26. The function of the capacitor 42 and the Zener diode 44 will be described hereinafter.

In accordance with this invention, in order to regulate the magnitude of the voltage across the load capacitor 12, a series circuit including a Zener diode 46 and a capacitor 48 is interconnected between the base electrode 30, of the transistor 24, and the emitter electrode 26. In operation, the capacitor 48 functions to effect a breakdown of the Zener diode 46 after it has been charged up to a sufficient value after one or more flyback operations, to thereby apply a cut-off voltage to the transistor 24, to thus render it non-conductive, as will be explained more fully hereinatfer. In order to provide a discharge path for the capacitor 48 once the Zener diode 46 has been broken down in the reverse direction and the transistor 24 is at the cut-off value, an impendance member, specifically an adjustable resistor 50, is connected in parallel circuit relationship with the capacitor 48. In practice, the resistor 50 can be adjusted so as to change the time required for the capacitor 48 to discharge from one voltage to another.

In operation, the Zener diode 44 functions to prevent a discharge of the capacitor 48 through the hold winding 20 once the Zener diode 46 breaks down in the reverse direction and provides a path for current flow from the hold winding 20 through the emitter and base electrodes 26 and 30, respectively, of transistor 24 when the voltage across the capacitor 42 is of sufficient value to break the Zener diode 44 down in the reverse direction. On the other hand, the capacitor 42 is connected in shunt with the Zener diode 44 in order to provide a complete circuit from the hold winding 20 through the emitter and base electrodes 26 and 30, respectively, of the transistor 24 so that when Zener diode 46 is not conducting in the reverse direction any change in voltage across the hold winding 20 of such polarity that the upper end of the hold winding 20, as shown, is at a positive polarity with respect to its lower end, effects a current flow through the emitter and base electrodes 26 and 30, respectively, in such a direction as to increase the flow of current from the positive terminal of the source 14 through the input winding 18 to thus further increase the magnitude of the voltage across the hold winding 20, to thereby effect a regenerative action in starting each conducting cycle of the transistor 24.

A unilateral conducting member, specifically a rectifier 52, is interconnected between the lower side of the hold winding 20, as shown, and the junction of the Zener diode 46 and the capacitor 48 in order to cause the voltage across the capacitor 48 to more closely approach the voltage across the hold winding 20 during a flyback pulse. In other words, there is a lower forward voltage drop across the rectifier 52 than there is across the Zener diodes 44 and 46 combined. Further, since the forward characteristics of the two Zener diodes 44 and 46 may be temperature sensitive if not properly chosen, some inaccuracy can be introduced into the regulated terminal voltage appearing across the load capacitor 12 due to ambient temperature changes if the rectifier 52 is not provided.

In order to render the load capacitor 12 responsive to the change in flux in the magnetic core member 16 when the current flow through the input winding 18 is decreasing and for a period of time thereafter when the transistor 24 is non-conductive, a unilateral conducting member, specifically a rectifier 54, is connected in series circuit relationship with the load winding 22 and is so poled to prevent the flow of current through the load capacitor 12 when the transistor 24 is conducting and current flow through the input winding 18 is increasing. As shown, the hold winding 20 and the load winding 22 are so wound on the magnetic core member 16 that when the current flow through the input winding 18 is increasing the upper end of the hold winding 20, as shown, is at a positive polarity with respect to its lower end and the lower end of the load winding 22, as shown, is simultaneously at a positive polarity with respect to its upper end.

When the flyback power inverter 10 is utilized as an electronic photo-flash circuit, a suitable photo-flash bulb 56, having built-in triggering circuitry, is connected across the load capacitor 12. In operation, the bulb 56 is switched or triggered to effect a discharge of the energy from the capacitor 12 through the photo-flash bulb 56.

The operation of the regulated flyback power inverter 10 will now be described. Upon actuation of the movable contact member 34, of the switch 32, to the circuit closed position with respect to the stationary contact member 36, and upon any disturbance in the voltage across the hold winding 20 of such polarity that the upper end of the hold winding 20, as shown, is at a positive polarity with respect to its lower end, a current flows through the emitter and base electrodes 26 and 30, respectively, and the capacitor 42 in such a direction as to increase the flow of current from the positive terminal of the source 14 through the input winding 18, to thus further increase the magnitude of the voltage across the hold winding 20, to thereby effect a regenerative action in starting the first conduction cycle of the transistor 24. When the current flowing through the capacitor 42 charges the capacitor 42 to the Zener level of diode 44 the Zener diode 44 breaks down in the reverse direction and control current continues to flow from the upper end of the holding winding 20, as shown, through the emitter electrode 26, the base electrode 30, and the Zener diode 44 in the reverse direction, to the lower end of the hold winding 20. The current flow through the input winding 18 increases substantially linearly, increasing the flux in the magnetic core member 16 in the positive direction, until a maximum collector current for the transistor 24 is reached for the given control current flowing through the transistor 24 from the hold winding 20. At this time, there is no further increase in the magnitude of the current flowing through the input winding 18 and thus the voltage across the hold winding 20 decreases, thereby decreasing the magnitude of the collector or power current flowing through the transistor 24 and the power winding 18. This decreasing current through the input winding 18 effects a reversal of the polarity of the voltage across the hold winding 20 so that the lower end of the hold winding 20, as shown, is at a positive polarity with respect to its upper end. This latter induced voltage across the hold winding 20 effects a flow of current from the lower end of the hold winding 20, as shown, through the rectifier 52 in the forward direction, and the capacitor 48 to the upper end of the hold winding 20, to thus charge the capacitor 48, during the time that the flux in the magnetic core member 16 is decreasing from its positive value, to essentially the magnitude of the voltage across the hold winding 20, which magnitude is in turn proportional by a turns ratio to the magnitude of the voltage across the load winding 22 which voltage is essentially equal to the voltage across the load capacitor 12. Simultaneously, the stored energy in the magnetic core member 16 effects a current flow from the upper end of the load winding 22, as shown, through the rectifier 54 in the forward direction and the load capacitor 12, to the lower end of the load winding 22, to thereby increase the charge on the capacitor 12.

When the stored energy in the magnetic core member 16 has been completely transferred to the load capacitor 12, the voltage across all of the windings 18, 20 and 22 decreases to zero value and the above described operation is again repeated, to thereby charge the capacitor 48 a further amount. After a number of flyback operations in which flyback current flows from the hold winding 20 through the capacitor 48, the capacitor 48 reaches a predetermined value which, at the termination of the last flyback operation, is sufficient to effect a breakdown of the Zener diode 46 in the reverse direction, to thereby apply a portion of the voltage appearing across the capacitor 48 between the emitter electrode 26 and the base electrode 30, of the transistor 24, to thus bias the transistor 24 sufficiently into cutoff as to prevent the above described regenerative action. It is at this time that the voltage across the load capacitor 12 reaches the regulated value.

Once the Zener diode 46 breaks down, and the transistor 24 is cut off, the capacitor 48 discharges through the resistor 50 and the transistor 24 remains cut off for a predetermined time. After this predetermined time which is dependent upon the value to which the adjustable resistor 50 has been set, the voltage across the capacitor 48 becomes insufficient to effect a breakdown of the Zener diode 46 in the reverse direction and the inverter 10 is now conditioned to effect one or more energy transfer cycles. In the meantime the load capacitor 12 has leaked off so as to effect a decrease of the voltage across it to a value below the regulated value and the inverter 10 goes through one or more energy transfer cycles to again charge up the capacitor 48 to such a value as to again break the Zener diode 46 down in the reverse direction and at the same time return the voltage across the load capacitor 12 to the regulated value. Thus, the Zener diode 46 and the capacitor 48 and its associated adjustable resistor 50 function to maintain the voltage across the load capacitor 12 at substantially the regulated value. In practice, the adjustable resistor 50 and the remainder of the circuitry must be such that it requires at least one flyback operation to return the voltage across the load capacitor 12 to the regulated value.

The capacitor 48, upon discharge of the load capacitor 12 into the photo-flash bulb 56, is not discharged to zero value through the adjustable resistor 50 before the inverter 10 again goes through its cycle of operation, and several flyback operations occur before the voltage across the hold winding 20 is of sufficient value to effect a further charging of the capacitor 48. However, when the voltage across the hold winding 20 and the rectifier 52 becomes greater than the voltage across the capacitor 48, the capacitor 48 is again charged up further and further in the manner hereinbefore described to thus again effect a breakdown of the Zener diode 46 in the reverse direction and thus cut the transistor 24 off.

Figure 2:
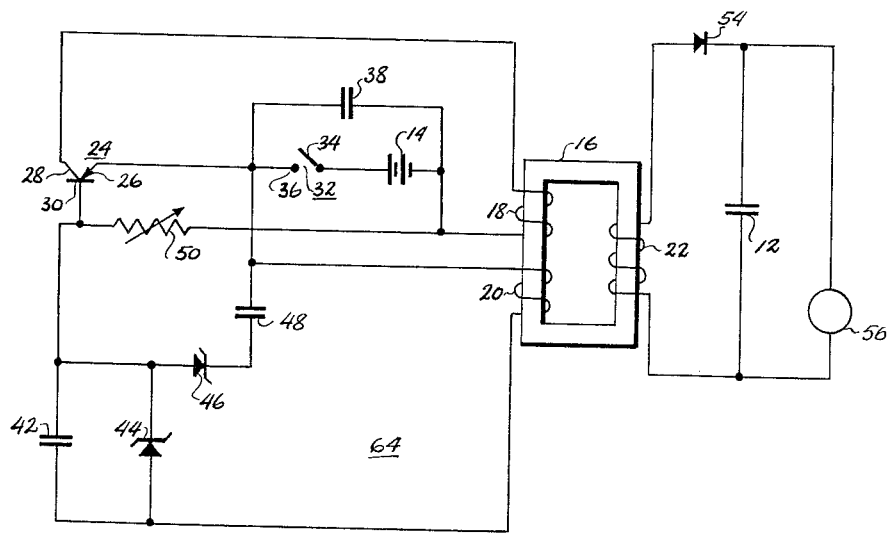
FIG. 2 is a schematic diagram of the apparatus and circuits illustrating another embodiment of the teachings of this invention in which improved starting means is provided for the flyback inverter.

Referring to FIG. 2 there is illustrated another embodiment of the teachings of this invention in which like components of FIGS. 1 and 2 have been given the same reference characters. The main distinction between the apparatus and circuits of FIGS. 1 and 2 is that in the apparatus and circuits of FIG. 2 the input source 14 has been relocated so as to be interconnected between the lower portion of the input winding 18 and the emitter electrode 26, of the transistor 24. In addition, the adjustable resistor 50 has also been relocated so as to be interconnected between the negative terminal of the input source 14 and the base electrode 30, of the transistor 24. With the input source 14 and the adjustable resistor 50 so relocated, the regulated flyback power inverter 64 shown in FIG. 2 starts more readily than does the flyback power inverter 10 of FIG. 1. Specifically, with the adjustable resistor 50 so interconnected with the remainder of the apparatus and circuits of FIG. 2 the input source 14 effects a bias of the transistor 24 to an operating point wherein a given change in voltage between the emitter electrode 26 and the base electrode 30 initially effects a larger change in the collector current of the transistor 24 as compared to the apparatus and circuits of FIG. 1 and thus improves the starting characteristics of the inverter 64.

During that portion of the operation when the capacitor 48 effects a breakdown of the Zener diode 46 in the reverse direction so as to permit a discharge of the capacitor 48 through the adjustable resistor 50, this discharge current flows in this instance from the capacitor 48 through the Zener diode 46 in the reverse direction, and the adjustable resistor 50, to the negative terminal, of the input source 14.

It is to be noted that the rectifier 52 has been omitted from the inverter 64 of FIG. 2. When so omitted the Zener diodes 44 and 46 provide a conducting path for charging the capacitor 48 and in some instances the Zener diodes 44 and 46 may be so chosen that with a change in ambient temperature the characteristics of the Zener diodes 44 and 46 so change that the regulated terminal voltage across the load capacitor 12 is less affected. That is, an increase in ambient temperature causes a decrease in forward voltage drop in Zener diodes 44 and 46 which will cause the capacitor 48 to charge to a slightly higher voltage at the increased temperature and this will tend to compensate the higher voltage magnitude required to make Zener diode 46 break down in the reverse direction at the increased temperature.

Since the remaining operation of the regulated flyback power inverter 64 is substantially the same as the operation of the regulated flyback power inverter 10 of FIG. 1, a further description of such operation is deemed unnecessary.

The apparatus and circuits embodying the teachings of this invention have several advantages. For instance, the flyback power inverter of this invention has a high energy transfer efficiency in charging a capacitive load from a low initial voltage to some higher voltage and thus when the inverter is utilized as an electronic photo-flash circuit, the recycle time for the photo-flash circuit is reduced. In addition, a simple and unique regulating means is provided for the inverter which effects non-asymptotic voltage regulation so as to further reduce the recycle time when the inverter is utilized for instance, as an electronic photo-flash circuit. The regulating means of this invention functions in such a manner that when an indicator bulb (not shown) is connected across an appropriate winding on the magnetic core member 16 the brilliance of the indicator bulb (not shown) will diminish abruptly to a readily distinguishable lower level of brilliance when the regulated terminal voltage across the capacitor 12 is reached. This in a photoflash application becomes an accurate indicator of the time when the load capacitor 12 is fully charged to the regulated value. Further, the power transistor of the inverters of this invention operate at a relatively low frequency when regulating at the terminal voltage, thus minimizing the energy loss in the transistor in going from the on to off condition. Also, the output or power rectifier of the inverters of this invention as applied to an electronic photo-flash circuit can have a lower voltage rating than the power rectifier of other conventional inverter circuits that are utilized for electronic photo-flash purposes.

Since certain changes may be made in the above described apparatus and circuits, and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a flyback inverter adapted to be connected to a source of direct-current to effect an output voltage, the combination comprising, a magnetic core member, input winding means disposed in inductive relationship with said magnetic core member, an amplifying device having control and load circuit electrode means and having characteristics such that a maximum output current for said device is reached when a given control signal is applied to said device and a decrease in output current from said maximum to substantially zero value is effected when said control signal is decreased sufficiently, circuit means for so connecting said control and load circuit electrode means and said input winding means in circuit relationship with one another and with said source, that said amplifying device controls the flow of current from said source through said input winding means, a series circuit including a voltage reference device and a capacitor, the series circuit being directly connected to said control and load circuit electrode means so as to maintain said amplifying device in a substantially non-conductive state when said capacitor has a given voltage thereacross sufficient to make said voltage reference device conductive, discharge means for effecting a reduction in the magnitude of said given voltage appearing across said capacitor, hold winding means disposed in inductive relationship with said magnetic core member, other circuit means for interconnecting said control and load circuit electrode means with said hold winding means so as to effect a flow of control current from said hold winding means through said amplifying device when the flow of current from said source through said input winding means is increasing to thus increase the flux in said magnetic core member in the positive direction and effect a flow of current from said hold winding means through said capacitor when the flux in said magnetic core member is decreasing from said positive value, to thus charge said capacitor, after one or more flybacks, to said given value of voltage sufficient to make said voltage reference device conductive, to thereby cut said amplifying device off, and output winding means disposed in inductive relationship with said magnetic core member, said output voltage in operation appearing at said output winding means.

2. In a flyback inverter adapted to be connected to a source of direct-current to effect an output voltage, the combination comprising, a magnetic core member, input winding means disposed in inductive relationship with said magnetic core member, an amplifying device having control and load electrode means and having characteristics such that a maximum output current for said amplifying device is reached when a given control signal is applied to said amplifying device and a decrease in output current from said maximum to substantially zero value is effected when said control signal is decreased sufficiently, circuit means for so connecting said control and load electrode means and said input winding means in circuit relationship with one another and with said source that said amplifying device controls the flow of current from said source through said input winding means, a series circuit including a voltage reference device and a capacitor, the series circuit being directly connected to said control and load electrode means so as to maintain said amplifying device in a substantially non-conductive state when said capacitor has a given voltage thereacross sufficient to make said voltage reference device conductive, discharge means for effecting a reduction in the magnitude of said given voltage appearing across said capacitor, hold winding means disposed in inductive relationship with said magnetic core member, other circuit means for interconnecting said control and load circuit electrode means with said hold winding means so as to effect a flow of control current from said hold winding means through said amplifying device when the flow of current from said source through said input winding means in increasing to thus increase the flux in said magnetic core member in the positive direction and effect a flow of current from said hold winding means through said capacitor when the flux in said magnetic core member is decreasing from said positive value, to thus charge said capacitor, after one or more flybacks, to said given value of voltage sufficient to make said voltage reference device conductive, to thereby cut said amplifying device off, said other circuit means including a non-linear device to substantially limit the discharge of said capacitor through said hold winding means once said voltage reference device becomes conductive, and output winding means disposed in inductive relationship with said magnetic core member, said output voltage in operation appearing at said output winding means.

3. In a flyback inverter adapted to be connected to a source of direct-current to effect an output voltage, the combination comprising, a magnetic core member, input winding means disposed in inductive relationship with said magnetic core member, an amplifying device having control and load electrode means and having characteristics such that a maximum output current for said amplifying device is reached when a given control signal is applied to said amplifying device and a decrease in output current from said maximum to substantially zero value is effected when said control signal is decreased sufficiently, circuit means for so connecting said control and load electrode means and said input winding means in circuit relationship with one another and with said source that said amplifying device controls the flow of current from said source through said input winding means, a series circuit including a voltage reference device and a first capacitor, the series circuit being directly connected to said control and load electrode means so as to maintain said amplifying device in a substantially non-conductive state when said first capacitor has a given voltage across and is sufficient to make said voltage reference device conductive, discharge means for effecting a reduction in the magnitude of said given voltage appearing across said first capacitor, hold winding means disposed in inductive relationship with said magnetic core member, other circuit means for interconnecting said control and load electrode means with said hold winding means so as to effect a flow of control current from said hold winding means through said amplifying device when the flow of current from said source through said input winding means is increasing, to thus increase the flux in said magnetic core member in the positive direction and effect a flow of current from said hold winding means through said first capacitor when the flux in said magnetic core member is decreasing from said positive value, to thus charge said first capacitor, after one or more flybacks, to said given value of voltage sufficient to make said voltage reference device conductive, to thereby cut said amplifying device off, said other circuit means including a parallel circuit, one branch of which includes a Zener diode and the other branch of which includes a second capacitor, said parallel circuit in operation functioning to substantially limit the discharge of said first capacitor through said hold winding means once said voltage reference device becomes conductive and permit the flow of control current from said hold winding means through said amplifying device when the flow of current from said source through said input winding means is increasing, and output winding means disposed in inductive relationship with said magnetic core member, said output voltage in operation appearing at said output winding means.

4. In a flyback inverter adapted to be connected to a source of direct-current to effect an output voltage, the combination comprising, a magnetic core member, input winding means disposed in inductive relationship with said magnetic core member, an amplifying device having control and load electrode means and having characteristics such that a maximum output current for said amplifying device is reached when a given control signal is applied to said amplifying device and a decrease in output current from said maximum to substantially zero value is effected when said control signal is decreased sufficiently, circuit means for so connecting said control and load electrode means and said input winding means in series circuit relationship with one another and with said source that said amplifying device controls the flow of current from said source through said input winding means, a series circuit including a voltage reference device and a capacitor, said series circuit being directly connected to said control and load electrode means so as to maintain said amplifying device in a substantially non-conductive state when said capacitor has a given voltage thereacross sufficient to make said voltage reference device conductive, discharge means for effecting a reduction in the magnitude of said given voltage appearing across said capacitor, hold winding means disposed in inductive relationship with said magnetic core member, other circuit means for interconnecting said control and load electrode means with said hold winding means so as to effect a flow of control current from said hold winding means through said amplifying device when the flow of current from said source through said input winding means is increasing to thus increase the flux in said magnetic core member in the positive direction and effect a flow of current from said hold winding means through said capacitor when the flux in said magnetic core member is decreasing from said positive value, to thus charge said capacitor, after one or more flybacks, to said given value of voltage sufficient to make said voltage reference device conductive, to thereby cut said amplifying device off, means for effecting bias current for said amplifying device to thus bias said amplifying device to an operating point wherein a given rate of change in the flux in said magnetic core member effects a greater change in the magnitude of the control current from said hold winding means through said amplifying device to thereby improve the starting characteristics of said amplifying device, said other circuit means including a non-linear device for substantially limiting the discharge of said capacitor through said hold winding means once said voltage reference device becomes conductive and preventing the short circuiting of said bias current through said hold winding means when the flux in said magnetic core member is not changing, and output winding means disposed in inductive relationship with said magnetic core member, said ouput voltage in operation appearing at said output winding means.

5. In a flyback inverter adapted to be connected to a source of direct-current to effect an output voltage, the combination comprising, a magnetic core member, input winding means disposed in inductive relationship with said magnetic core member, a transistor having a control electrode and two load electrodes, circuit means for interconnecting said source between one side of said input winding means and one of said two load electrodes and for connecting the other of said two load electrodes to the other side of said input winding means so that said transistor controls the flow of current from said source through said input winding means, a bias resistor connected between said control electrode and the juncture of said source and said input winding means for effecting a bias current for said transistor, a series circuit including a voltage reference device and a first capacitor, the series circuit being connected between said control electrode and said one of said two load electrodes, hold winding means disposed in inductive relationship with said magnetic core member, a parallel circuit one branch of which includes a second capacitor and a non-linear device, other circuit means for interconnecting said parallel circuit between said control electrode and one side of said hold winding means and for connecting the other side of said hold winding means to said one of said two load electrodes so as to effect a flow of control current through said transistor when the flow of current from said source through said input winding means is increasing, to thus increase the flux in said magnetic core member in the positive direction and effect a flow of current from said hold winding means through said first capacitor when the flux in said magnetic core member is decreasing from said positive value, to thus charge said first capacitor, after one or more flybacks, to a value sufficient to make said voltage reference device conductive, to thereby cut said transistor off, said non-linear device functioning to substantially limit the discharge of said first capacitor through said hold winding means once said voltage reference device becomes conductive and to prevent the shorting of said bias current through said hold winding means when the flux in said magnetic core member is not changing, and output winding means disposed in inductive relationship with said magnetic core member, said output voltage in operation appearing at said output winding means.

References Cited in the file of this patent

UNITED STATES PATENTS

| | | |
|---|---|---|
| 2,854,615 | Light | Sept. 30, 1958 |
| 2,915,710 | Schiewe et al. | Dec. 1, 1959 |